(12) United States Patent
Cho et al.

(10) Patent No.: US 8,654,834 B2
(45) Date of Patent: Feb. 18, 2014

(54) METHOD FOR TUNING CODING RATE AND APPLYING UNEQUAL ERROR PROTECTION FOR ADAPTIVE VIDEO TRANSMISSION, AND VIDEO TRANSMISSION/RECEPTION APPARATUS USING THE METHOD

(75) Inventors: Yong Ju Cho, Seoul (KR); Jin Woo Hong, Daejeon (KR); Han Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1081 days.

(21) Appl. No.: 12/652,123

(22) Filed: Jan. 5, 2010

(65) Prior Publication Data
US 2010/0171882 A1 Jul. 8, 2010

(30) Foreign Application Priority Data

Jan. 6, 2009 (KR) .................. 10-2009-0000945
Dec. 18, 2009 (KR) .................. 10-2009-0127232

(51) Int. Cl.
*H04B 1/66* (2006.01)
*H04N 7/12* (2006.01)

(52) U.S. Cl.
USPC .................. 375/240.01; 348/390.1

(58) Field of Classification Search
USPC ............. 348/14.01, 14.02, 14.12, 420, 390.1; 375/240.01–240.26; 386/67, 68, 109, 386/111, 112, 27, 33, 69, 37, 110
See application file for complete search history.

(56) References Cited

U.S. PATENT DOCUMENTS

| 7,376,883 | B2 | 5/2008 | Eroz et al. | |
| 2003/0231655 | A1* | 12/2003 | Kelton et al. | 370/468 |
| 2005/0169312 | A1* | 8/2005 | Cakareski et al. | 370/473 |
| 2006/0095944 | A1 | 5/2006 | Demircin et al. | |
| 2006/0291591 | A1* | 12/2006 | Ghosh | 375/340 |
| 2008/0025204 | A1* | 1/2008 | Radha et al. | 370/216 |

FOREIGN PATENT DOCUMENTS

| KR | 1020090071005 A | 7/2009 |
| WO | 01/39423 A2 | 5/2001 |
| WO | 2006/020032 A1 | 2/2006 |
| WO | 2007/073362 A1 | 6/2007 |

OTHER PUBLICATIONS

Yongiu Cho et al., On Channel Capacity Estimation and Prediction for Rate Adaptive Wireless Video, Nov. 2008,vol. 10, pp. 1419-1426.*

* cited by examiner

*Primary Examiner* — Behrooz Senfi
(74) *Attorney, Agent, or Firm* — Ladas & Parry LLP (57) ABSTRACT

Provided are a method of tuning a coding rate and applying an unequal error protection for an adaptive video transmission, and a video transmission/reception apparatus using the method. The video transmission apparatus may include: a coding rate tuner to predict, as a channel capacity of a subsequent channel interval, an estimated channel capacity value fed back from the video reception apparatus, and to tune video and channel coding rates within the predicted channel capacity; a video encoder to perform video encoding of video frames at the tuned video coding rate, and to generate a video packet; and a forward error correction (FEC) encoder to apply the unequal error protection based on a length of the video packet and a type of the video frames included in the video packet, and to perform channel encoding of the video packet at the tuned channel coding rate to generate a bitstream.

20 Claims, 6 Drawing Sheets

METHOD FOR TUNING CODING RATE AND APPLYING UNEQUAL ERROR PROTECTION FOR ADAPTIVE VIDEO TRANSMISSION, AND VIDEO TRANSMISSION/RECEPTION APPARATUS USING THE METHOD

CROSS-REFERENCE TO RELATED APPLICATIONS

This application claims the benefit of Korean Patent Application No. 10-2009-0000945, filed on Jan. 6, 2009, and Korean Patent Application No. 10-2009-0127232, filed on Dec. 18, 2009, in the Korean Intellectual Property Office, the disclosure of which is incorporated herein by reference.

BACKGROUND

1. Field of the Invention

Embodiments of the present invention relate to a method of tuning a coding rate and applying an unequal error protection for an adaptive video transmission, and a video transmission/reception apparatus using the method. More particularly, embodiments of the present invention relate to a method and apparatus that enables a video transmission apparatus, for example, a server to optimally tune a video coding rate and a channel coding rate based on the estimated channel capacity, and to apply an unequal error protection based on a characteristic of a frame, when a video reception apparatus, for example, a client estimates and feeds back a channel capacity using a bit error rate (BER) of a received packet.

2. Description of the Related Art

In radio environments, a weak signal strength may cause many bit errors and a packet loss. Accordingly, a link quality and a channel status may be estimated to decrease the packet loss in a radio terminal. In particular, for a real-time video adaptation, it may be essential to accurately perform a radio channel capacity in real time. The link quality may be significantly affected by interference, fading, multi-path effects, a mobility, and the like. A change in them may significantly change the channel capacity.

To decrease the packet loss in the radio terminal, researches have been actively conducted on a Cross Layer Design (CLD) protocol. The CLD protocol corresponds to a technology that may transfer a packet containing a bit error to an upper layer, so that the upper layer may utilize the packet.

Researches made so far have verified that a video throughput may increase using the CLD protocol. Side information may be utilized in a current wireless local area network (LAN). The researches have also verified that the side information is important to estimate a channel status. The side information may include a signal to silence ratio (SSR) and a checksum. Here, the SSR corresponds to a signal-to-noise ratio (SNR) parameter of a packet level.

Recognizing the importance of the side information, a CLD protocol utilizing the side information, that is, a CLD with side information (CLDS) has appeared. The CLDS protocol may be very usefully applicable to a real-time video rate adaptation application. In particular, when a link quality is estimated based on the CLDS protocol, the link quality may be more accurately estimated using an entropy of a residue error process.

SUMMARY

An aspect of the present invention provides a method of tuning a coding rate and applying an unequal error protection for an adaptive video transmission, and a video transmission/reception apparatus using the method.

Another aspect of the present invention also provides a method and apparatus that enables a video transmission apparatus, for example, a server to optimally tune a video coding rate and a channel coding rate based on an estimated channel capacity, and to apply an unequal error protection based on a characteristic of a frame when the estimated channel capacity is received from a video reception apparatus, for example, a client.

According to an aspect of the present invention, there is provided a method of tuning a coding rate and applying an unequal error protection for an adaptive video transmission, the method including: predicting, as a channel capacity of a subsequent channel interval, an estimated channel capacity value that is fed back from a video reception apparatus; tuning a video coding rate and a channel coding rate within the predicted channel capacity; performing video encoding of video frames at the tuned video coding rate to generate the video frames as a video packet; applying the unequal error protection based on a length of the video packet and a type of the video frames included in the video packet; and performing channel encoding of the unequal error protected video packet at the tuned channel coding rate to generate the video packet as a bitstream.

According to another aspect of the present invention, there is provided a video transmission apparatus of tuning a coding rate and applying an unequal error protection for an adaptive video transmission, the video transmission apparatus including: a coding rate tuner to predict, as a channel capacity of a subsequent channel interval, an estimated channel capacity value that is fed back from a video reception apparatus, and to tune a video coding rate and a channel coding rate within the predicted channel capacity; a video encoder to perform video encoding of video frames at the tuned video coding rate, and to generate the video frames as a video packet; and a forward error correction (FEC) encoder to apply the unequal error protection based on a length of the video packet and a type of the video frames included in the video packet, and to perform channel encoding of the unequal error protected video packet at the tuned channel coding rate to generate the video packet as a bitstream.

EFFECT

According to embodiments of the present invention, there may be provided a method and apparatus that enables a video transmission apparatus, for example, a server to optimally tune a video coding rate and a channel coding rate based on an estimated channel capacity, and to apply an unequal error protection based on a characteristic of a frame when the estimated channel capacity is received from a video reception apparatus, for example, a client. Since the video coding rate and the channel coding rate are tuned based on an estimated channel capacity value, a robust rating adaption may be applied. Since the unequal error protection is applied based on a characteristic of a video frame, it is possible to enhance a decoding success rate of a relatively important video frame.

DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description may render the purpose of the present invention unnecessarily ambiguous, the detailed description will be omitted here.

According to an embodiment of the present invention, there is provided a method and apparatus that enables a video transmission apparatus, for example, a server to optimally tune a video coding rate and a channel coding rate based on an estimated channel capacity, and to apply an unequal error protection based on a characteristic of a frame when the estimated channel capacity is received from a video reception apparatus, for example, a client.

Figure 1:
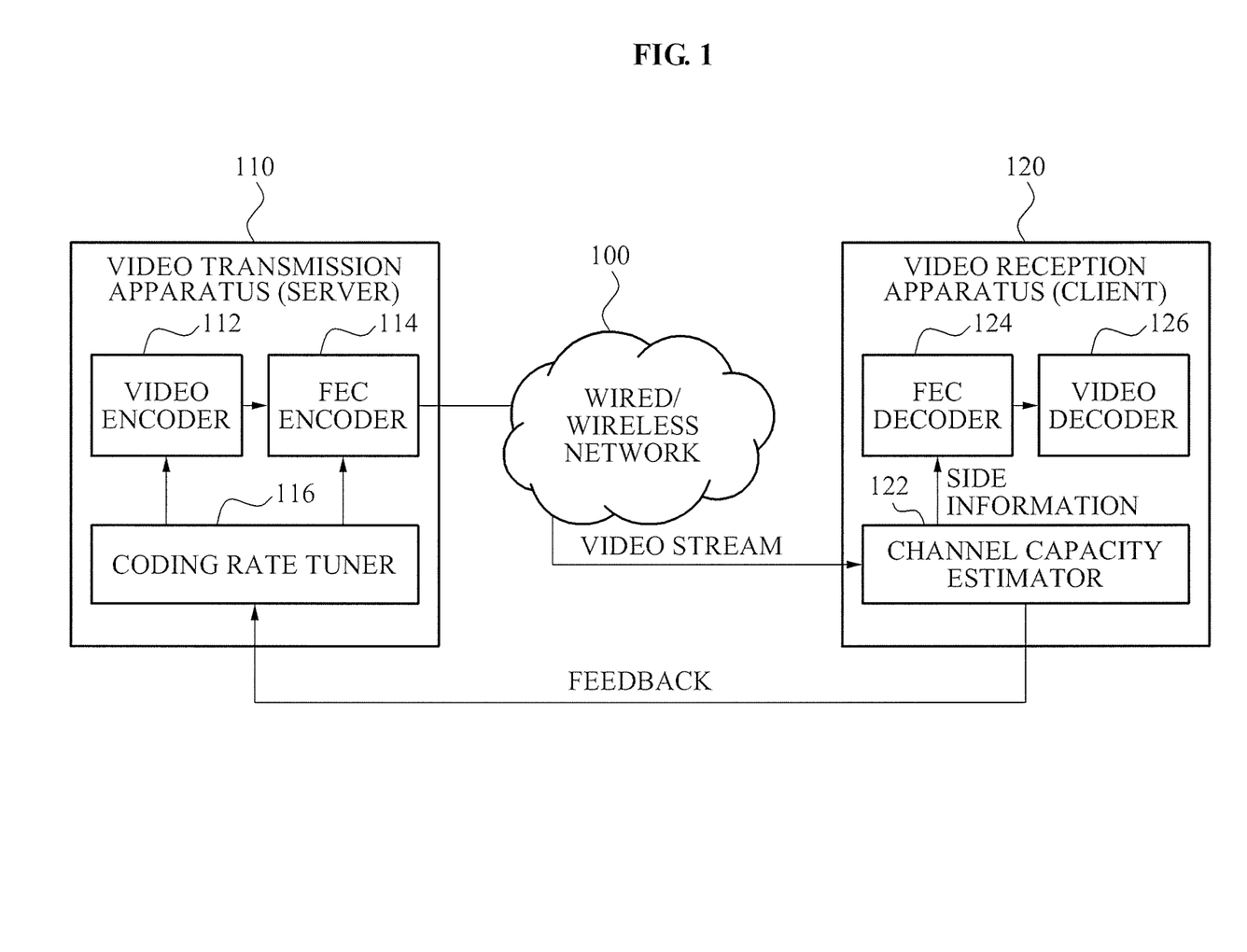
FIG. 1 is a block diagram illustrating a configuration of a video service system for an adaptive video transmission according to an embodiment of the present invention.

FIG. 1 is a block diagram illustrating a configuration of a video service system for an adaptive video transmission according to an embodiment of the present invention. Referring to FIG. 1, the video service system may include a video transmission apparatus 110, for example, a server, a video reception apparatus, 120 for example, a client, and a wired/wireless network 110 transferring data.

When the video reception apparatus 120 estimates and feeds back a channel capacity, the video transmission apparatus 110 may optimally tune a video coding rate and a channel coding rate using the estimated channel capacity. The video transmission apparatus 110 may apply an unequal error protection based on a characteristic of a video frame to be transmitted.

The video reception apparatus 120 may include a channel capacity estimator 122, a forward error correction (FEC) decoder 124, and a video decoder 126.

The channel capacity estimator 122 may receive side information associated with a channel status from a video stream received via the wired/wireless network 100. The side information may include, for example, a checksum, a signal to silence ratio (SSR). The channel capacity estimator 122 may estimate a bit error rate of a received video packet and estimate a channel capacity using the estimated bit error rate and then may feed back the estimated channel capacity to the video transmission apparatus 110. A method of estimating the channel capacity will be further described with reference to FIG. 2.

The FEC decoder 124 corresponds to a channel decoder for correcting a channel error. The FEC decoder 124 may perform channel decoding of the video stream using the side information associated with the channel status that is transferred from the channel capacity estimator 122. Packets included in the video stream may be unequal error protected according to a type of an included video frame. Accordingly, the FEC decoder 124 may perform channel decoding of the video stream based on the unequal error protection.

The video decoder 126 may perform video decoding of the channel decoded video stream, and restore the video stream.

The video transmission apparatus 110 may include a video encoder 112, a FEC encoder 114, and a coding rate tuner 116.

The video encoder 112 may encode video data based on a video coding rate tuned by the coding rate tuner 116.

The FEC encoder 114 corresponds to a channel encoder for correcting a channel error, and may apply the unequal error protection to a video encoding result based on a type of a video frame. The FEC encoder 114 may perform channel encoding based on a channel coding rate tuned by the coding rate tuner 116. A video stream may be generated using the video encoder 112 and the FEC encoder 114.

The coding rate tuner 116 may optimally tune the video coding rate of the video encoder 112 and the channel coding rate of the FEC encoder 1114 within a range allowed by the estimated channel capacity that is fed back from the video reception apparatus 120.

A method of tuning the video coding rate and the channel coding rate will be further described with reference to FIG. 2.

Hereinafter, a method of estimating a channel capacity, tuning a coding rate for an adaptive video transmission, and applying an unequal error protection according to an embodiment of the present invention will be described.

Figure 2:
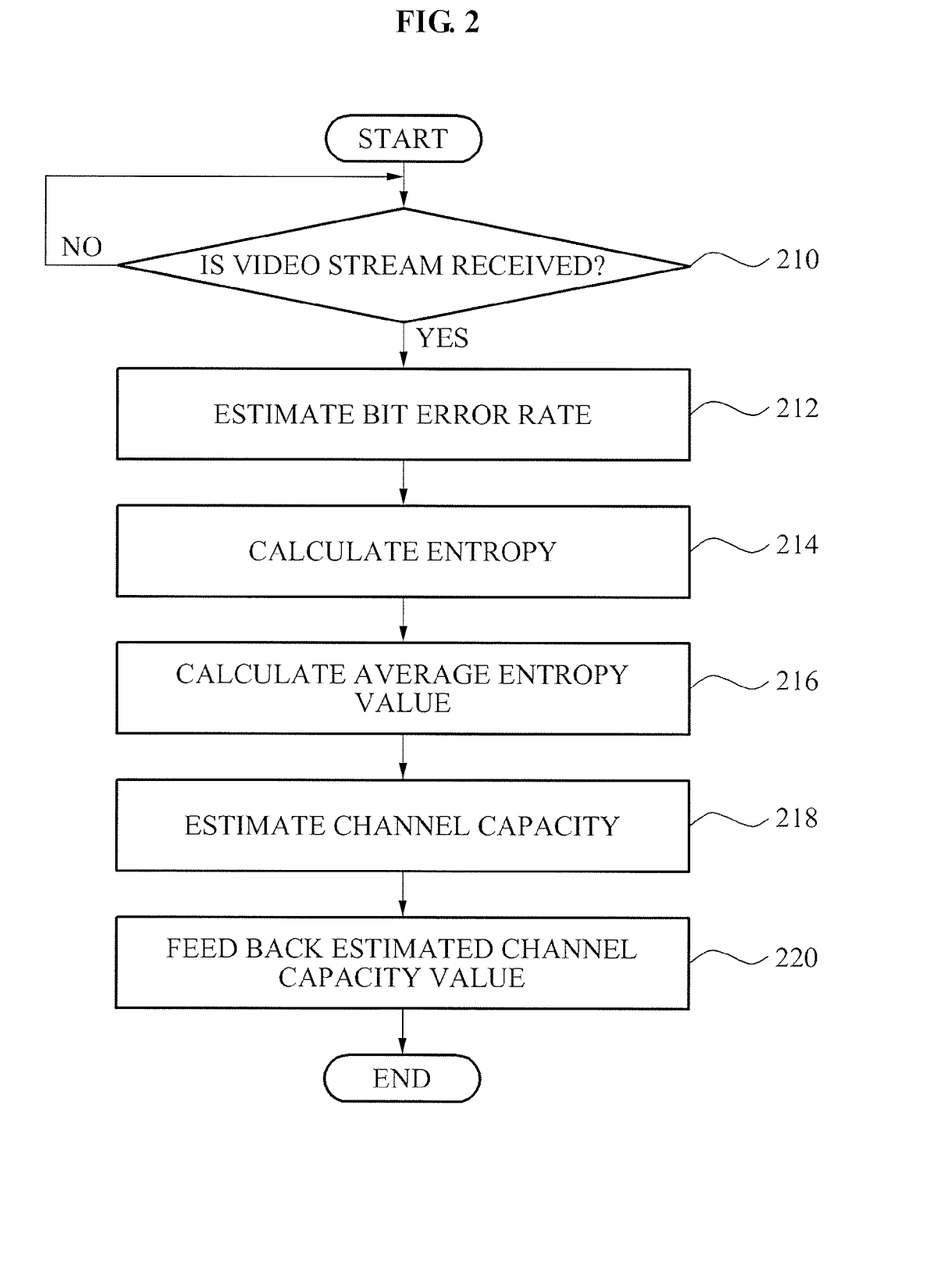
FIG. 2 is a flowchart illustrating a method of estimating and feeding back a channel capacity at a video reception apparatus, for example, a client according to an embodiment of the present invention.

FIG. 2 is a flowchart illustrating a method of estimating and feeding back a channel capacity at a video reception apparatus, for example, a client according to an embodiment of the present invention. The method of estimating the channel capacity may be performed by constituent components included in the video reception apparatus 120 of FIG. 1.

When a video stream is received via the network 100 of FIG. 1 in operation 210, the channel capacity estimator 122 may estimate a bit error rate of each of video packets included in the video stream in operation 212.

In operation 214, the channel capacity estimator 122 may calculate an entropy with respect to the estimated bit error rate. In operation 216, the channel capacity estimator 122 may calculate an average entropy value of a single video adaptive period.

In operation 218 the channel capacity estimator 122 may estimate the channel capacity using the average entropy value. In operation 220, the channel capacity estimator 122 may feed back an estimated channel capacity value to the video transmission apparatus 110, for example, the server.

The estimation of the channel capacity may be expressed by the following Equation 1:

$$\tilde{C}_n^{CLDS} = 1 - \frac{1}{m}\sum_{i=1}^{m} H_b(\tilde{\varepsilon}_i),$$ [Equation 1]

where $\tilde{C}_n^{CLDS}$ denotes the estimated channel capacity value, $\tilde{\varepsilon}_i$ denotes an estimate value of a bit error rate with respect to a packet i, $H_b(\tilde{\varepsilon}_i)$ denotes an instantaneous perpacket entropy, and m denotes a number of packets included in the single video adaptive period.

Figure 3:
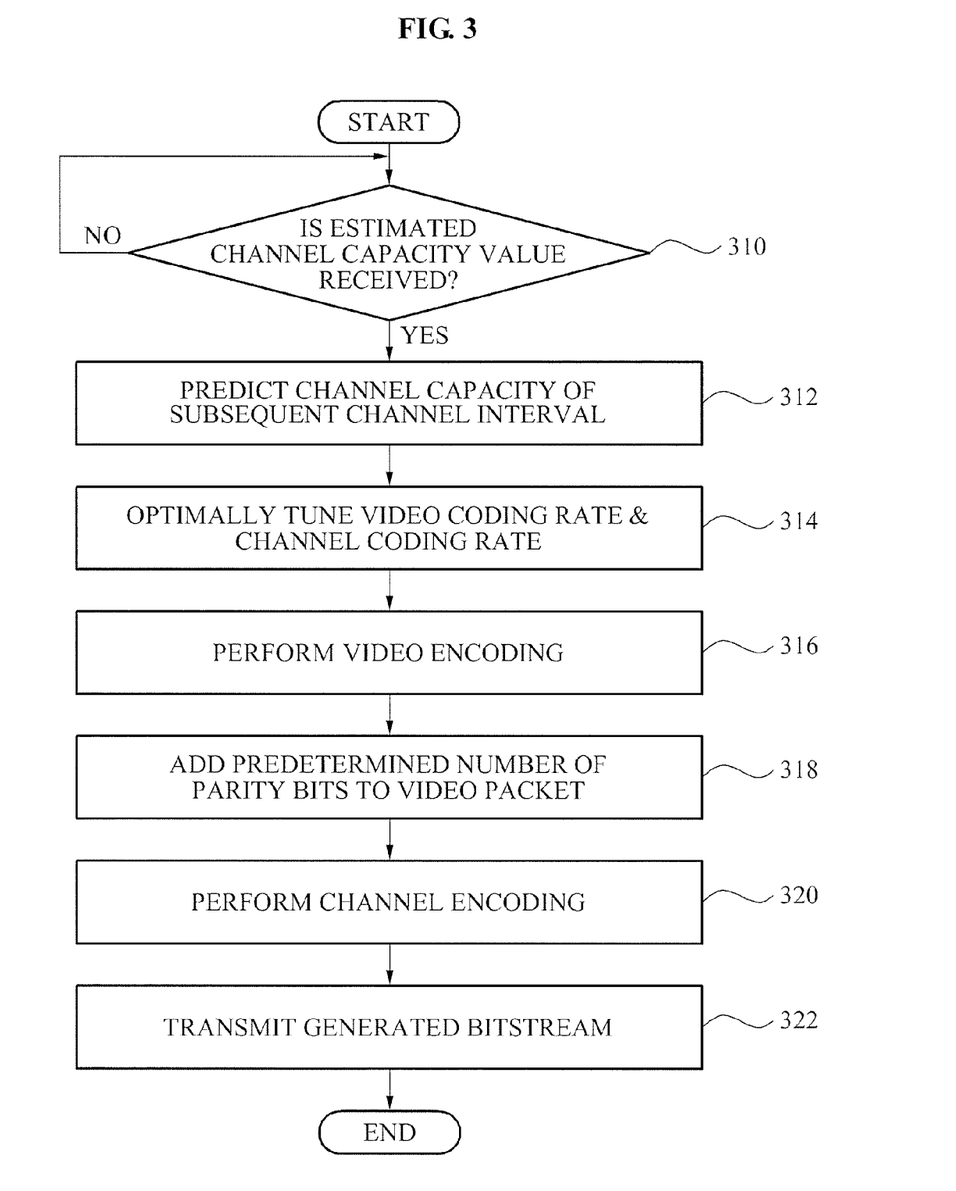
FIG. 3 is a flowchart illustrating a method of tuning a video coding rate and a channel coding rate to transmit an unequal error protected video stream at a video transmission apparatus, for example, a server according to an embodiment of the present invention.

FIG. 3 is a flowchart illustrating a method of tuning a video coding rate and a channel coding rate to transmit an unequal error protected video stream at a video transmission apparatus, for example, a server according to an embodiment of the present invention. The method of tuning the video coding rate and the channel coding rate may be performed by constituent components included in the video transmission apparatus 110 of FIG. 1.

When an estimated channel capacity value is fed back from the video reception apparatus 120 of FIG. 1 in operation 310, the coding rate tuner 116 may predict a channel capacity of a subsequent channel interval using the estimated channel capacity value in operation 312. In this instance, an estimated channel capacity value of a previous channel interval fed back from the video reception apparatus 120 may be utilized as a predictive value of the channel capacity of the subsequent channel interval.

In operation 314, the coding rate tuner 116 may optimally tune the video coding rate and the channel coding rate using a rate distortion function and a screen quality distortion function of a video within the predicted channel capacity.

An optimal video coding of the subsequent channel interval may be a value at which a peak signal to noise ratio (PSNR) value of a video being transmitted is optimal during a corresponding channel interval. Here, a sum of the video coding rate and the channel coding rate may be "1". For example, when the video is being transmitted at 500 kbp, and a current channel capacity rate is 0.8, transmission may be performed by encoding the video at 400 kbps and performing channel coding of parity bits at 100 kbp corresponding to a remaining channel coding rate. As described above, when the sum of the video coding rate and the channel coding rate is equal to "1", a channel may be optimally utilized.

Specifically, when the channel coding rate decreases, a probability that a predicted channel capacity value exceeds an actual channel capacity value may decrease. However, a value of the rate distortion function may decrease and thereby an entire PSNR value may also decrease. Conversely, when the channel coding rate increases, a value of the rate distortion function of the video may increase. However, a probability that the estimated channel capacity value exceeds the actual channel capacity value may also increase. Accordingly, the entire PSNR value may become a lowest value. The channel capacity rate that is less than the predicted channel capacity value, but has an optimal PSNR value may be found using Equation 3 as below.

Prior to describing tuning of the video coding rate and the channel coding rate, all the existing channel codes may have a deteriorated performance compared to a channel capacity. Accordingly, a performance may be deteriorated depending on a performance of a channel code, and an alpha α may be applied as shown in Equation 2 as below. In the case of an ideal channel code, the alpha α may be 1. Generally, as shown in an experiment of FIG. 6, the alpha α may be greater than or equal to 2. Equation 2 may be given by:

$$R^{op} = 1 - \alpha \cdot H(\varepsilon),$$
$$1 \le \alpha \le \frac{1}{H(\varepsilon)},$$

[Equation 2]

where $R^{op}$ denotes the video/channel coding rate with a deteriorated performance in operation, α denotes a parameter to determine a parity bit size, and H(ε) denotes an instantaneous perpacket entropy.

The video coding rate and the channel coding rate may be tuned using the following Equation 3:

$$\overset{*}{R}_n^{op} = \underset{R_n^{op}(0 \le R_n^{op} \le 1)}{\operatorname{argmax}} Q(R_n^{op}T) \cdot \frac{\int_{R_n^{op}-\hat{C}_n^{op}}^{1-\hat{C}_n^{op}} \frac{1}{\sqrt{2\pi}\,\sigma_e} \exp\left(\frac{-e_n^2}{2\sigma_e^2}\right) de}{\int_{-\hat{C}_n^{op}}^{1-\hat{C}_n^{op}} \frac{1}{\sqrt{2\pi}\,\sigma_e} \exp\left(\frac{-e_n^2}{2\sigma_e^2}\right) de} + Q'\left(\frac{R_n^{op}-C_n^{op}}{R_n^{op}}\right) \cdot \frac{\int_{-\hat{C}_n^{op}}^{R_n^{op}-\hat{C}_n^{op}} \frac{1}{\sqrt{2\pi}\,\sigma_e} \exp\left(\frac{-e_n^2}{2\sigma_e^2}\right) de}{\int_{-\hat{C}_n^{op}}^{1-\hat{C}_n^{op}} \frac{1}{\sqrt{2\pi}\,\sigma_e} \exp\left(\frac{-e_n^2}{2\sigma_e^2}\right) de},$$

[Equation 3]

where $$\overset{*}{R}_n^{op}$$

denotes a predicted video coding rate, Q(.) denotes the rate distortion function of the video, Q'(.) denotes the screen quality distortion function of the video, $R_n^{op}$ denotes the video/channel coding rate with the deteriorated performance in operation, $$\hat{C}_n^{op}$$

denotes a predicted channel capacity value of a current channel interval with a deteriorated performance, $e_n$ denotes a channel prediction error that is obtained based on a difference between the predicted channel capacity value of the current channel interval and a predicted channel capacity value of a previous channel interval, T denotes a packet transmit rate, $\sigma_e$ denotes a sigma value of when the channel prediction error is expressed as a Gaussian distribution, and $C_n^{op}$ denotes the channel capacity value of the current channel interval.

The rate distortion function of the video may be obtained when encoding the video, and may be expressed by Equation 4 as below.

Figure 4:
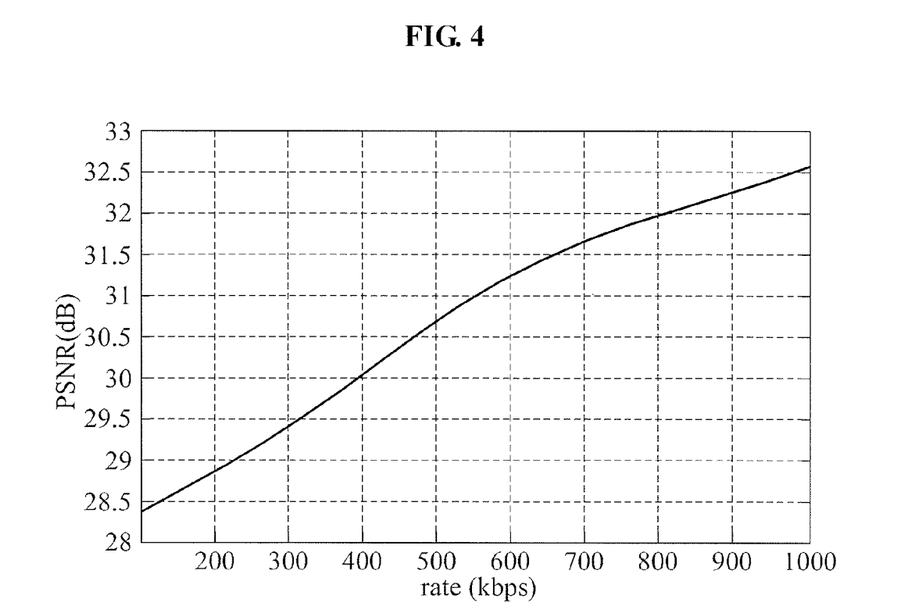
FIG. 4 is a graph illustrating a rate distortion function of a video according to an embodiment of the present invention.

FIG. 4 is a graph illustrating a rate distortion function of a video according to an embodiment of the present invention. The rate distortion function of the video rate of FIG. 4 shows a relationship between a bit rate and a PSNR corresponding to a screen quality standard.

The quality distortion function Q'(.) of the video indicates a function that expresses a distortion of a screen quality of the video over a surplus of a channel capacity, and may be expressed by the following Equation 4:

$$Q'(x) = ax^b + c, \quad 0 \le x \le 0.12$$

[Equation 4]

Figure 5:
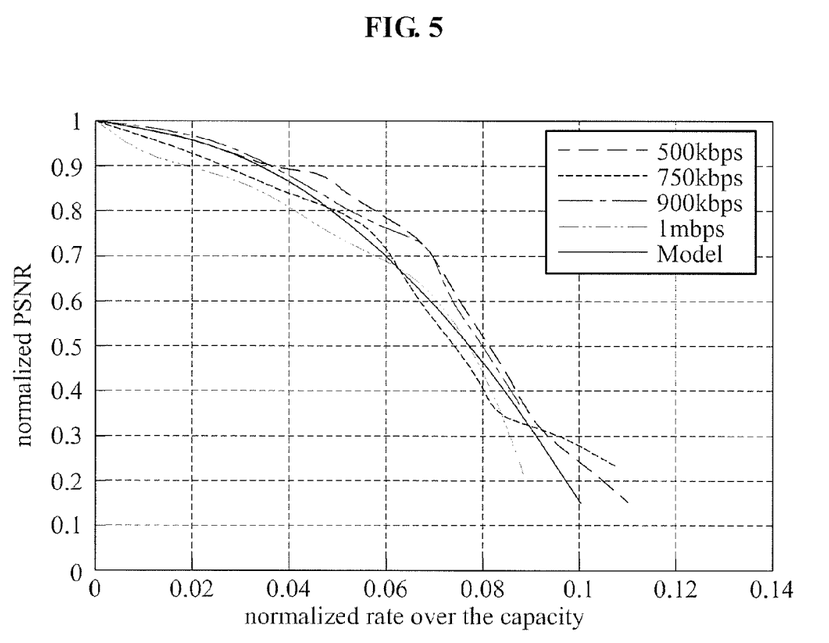
FIG. 5 is a graph illustrating a screen quality distortion function of a video over a surplus of a channel capacity according to an embodiment of the present invention.

The screen quality distortion function of the video expressed by the above Equation 4 may be determined by an experiment as shown in FIG. 5. The experiment may determine a=−1.18×10², b=2.148 and c=0.9898.

FIG. 5 is a graph illustrating a screen quality distortion function of a video over a surplus of a channel capacity according to an embodiment of the present invention.

x that is an element of the screen quality distortion function Q"(x) of the video denotes a difference between a coding rate to be predicted and a channel capacity, that is, $$\frac{R_n^{op} - C_n^{op}}{R_n^{op}}.$$

Accordingly, the distortion of the screen quality of the video may increase according to an increase in the difference.

In operation 316, the encoder 112 of FIG. 1 may perform video encoding of video data including video frames based on the tuned video coding rate.

In operation 318, the FEC encoder 114 may add a predetermined number of parity bits to a video packet based on a characteristic of frames included in the video packet and a length of the video packet. In operation 320, the FEC encoder 114 may perform channel coding of the video packet with the predetermined number of parity bits added based on the tuned channel coding rate.

Figure 6:
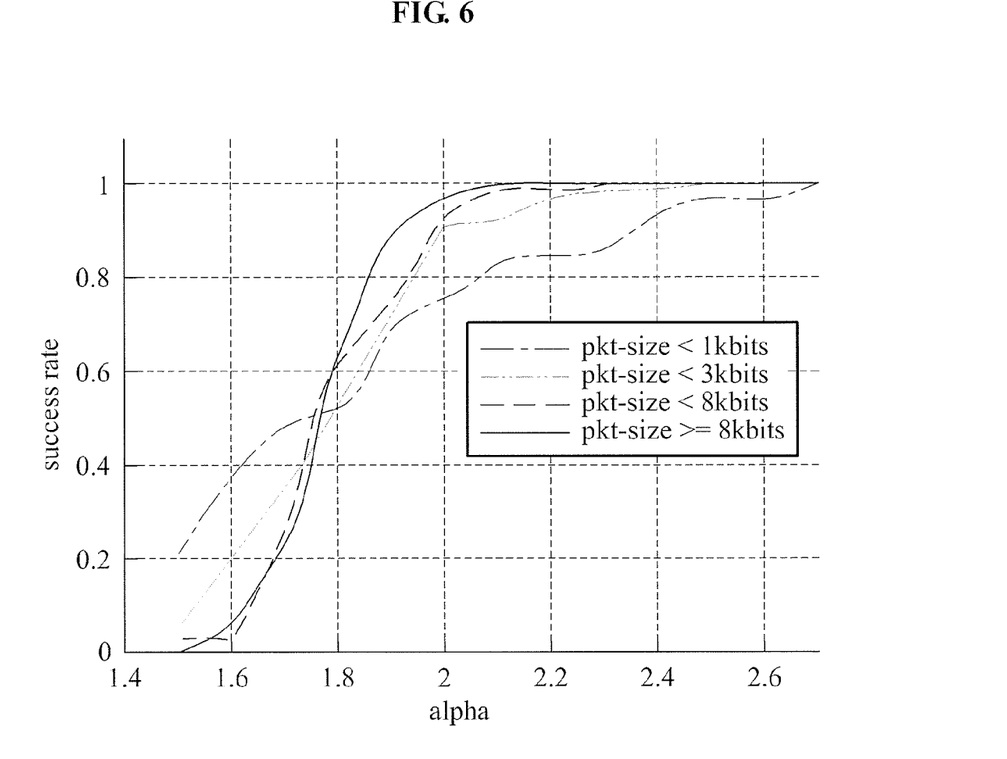
FIG. 6 is a graph illustrating a decoding success rate based on an alpha value and a packet length for applying an unequal error protection according to an embodiment of the present invention.

As shown in FIG. 6, a decoding success rate of an encoded video packet included in a video stream may be affected by a length of the video packet. FIG. 6 is a graph illustrating a decoding success rate based on an alpha value and a packet length for applying an unequal error protection according to an embodiment of the present invention.

The FEC encoder 114 of FIG. 1 may set an alpha $\alpha$ based on a video packet and a characteristic of a video frame included in the video packet, and may set a length of a parity bit using the alpha $\alpha$. The characteristic of the video frame may include three types, for example, an intra-coded frame (I-frame), a predictive-coded frame (P-frame), and a bi-directionally predictive-coded frame (B-frame). The I-frame may be encoded using only information associated with a current input frame. The P-frame may be encoded using a motion prediction with respect to a temporally preceding, that is, previous I-frame or P-frame. The B-frame may be encoded using a motion prediction with respect to the previous I-frame or P-frame and a following, that is, subsequent I-frame or P-frame.

An importance of the encoded video frame may be different based on a type of the video frame. For example, the P-frame or the B-frame may not be encoded without using the I-frame.

Accordingly, a packet containing the I-frame may perform channel coding by applying the alpha $\alpha$ having a relatively high success rate. It is possible to make the packet containing the I-frame robust against an error by allocating a relatively large number of parity bits to the packet. For example, when the packet contains the I-frame of 800 bits, parity bits may be allocated by applying 2.7 as the alpha $\alpha$.

When channel coding of the packet containing the I-frame is performed, a packet containing the P-frame may perform channel coding by applying the alpha $\alpha$ as shown in the following Equation 5:

$$\alpha_P = \frac{\alpha \sum_{i=1}^{N} L_i - \sum_{i=1}^{k} \alpha_i^I L_i^I}{\sum_{i=k+1}^{N} L_i^P},$$

where $\alpha$ denotes a parameter to determine a parity bit size, $\alpha_P$ denotes a parameter to determine a parity bit size of the packet containing the P-frame, $\alpha_i^I$ denotes a parameter to determine a parity bit size of an i-th packet containing the I-frame, $L_i$ denotes a length of the i-th packet, $L_i^I$ denotes a length of the i-th packet containing the I-frame, $L_i^P$ denotes a length of the i-th packet containing the P-frame, N denotes a total number of packets, and K denotes a number of packets containing the I-frame.

A total of parity bits may be calculated using the above Equation 3, and may be arranged as given by the following Equation 6:

$$\alpha \cdot H(\varepsilon) \cdot \sum_{i=1}^{n} L_i = H(\varepsilon) \cdot \sum_{i=1}^{k} \alpha_i^I L_i^I + \alpha_P \cdot H(\varepsilon) \cdot \sum_{i=k+1}^{n} L_i^P,$$ [Equation 6]

where $\alpha$ denotes the parameter to determine the parity bit size, $\alpha_P$ denotes the parameter to determine the parity bit size of the packet containing the P-frame, $\alpha_i^I$ denotes the parameter to determine the parity bit size of the i-th packet containing the I-frame, $L_i$ denotes the length of the i-th packet, $L_i^I$ denotes the length of the i-th packet containing the I-frame, $L_i^P$ denotes the length of the i-th packet containing the P-frame, N denotes the total number of packets, and K denotes the number of packets containing the I-frame.

In operation 322, the video transmission apparatus 110 may transmit, to the video reception apparatus 120, for example, the client, the bitstream that is generated by channel encoding.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of tuning a coding rate and applying an unequal error protection for an adaptive video transmission, the method comprising:
    predicting, as a channel capacity of a subsequent channel interval, an estimated channel capacity value that is fed back from a video reception apparatus;

tuning a video coding rate and a channel coding rate within the predicted channel capacity, wherein tuning comprises:
calculating the video coding rate using a rate distortion function and a screen quality distortion function of a video within the predicted channel capacity such that the screen quality distortion function Q'(x) of the video is expressed by the following equation:
Q'(x)=ax$^b$+c, 0≤x≤0.12, wherein x denotes an element of the screen quality distortion function of the video, and a, b, and c denote values determined based on an experiment; and
calculating the channel coding rate using the video coding rate;
performing video encoding of video frames at the tuned video coding rate to generate the video frames as a video packet;
applying the unequal error protection based on a length of the video packet and a type of the video frames included in the video packet; and
performing channel encoding of the unequal error protected video packet at the tuned channel coding rate to generate the video packet as a bitstream.

2. The method of claim 1, wherein the tuned video coding rate indicates a value at which a peak signal to noise ratio (PSNR) value of a video being transmitted is optimal during a corresponding channel interval.

3. The method of claim 1, wherein screen quality distortion function x denotes a difference between a coding rate to be predicted and a channel capacity expressed by the following equation:

$$x = \frac{R_n^{op} - C_n^{op}}{R_n^{op}},$$

wherein $R_n^{op}$ denotes the video/channel coding rate with the deteriorated performance in operation, and $C_n^{op}$ denotes a channel capacity value of a current channel interval.

4. The method of claim 1, wherein the rate distortion function of the video indicates a function that is obtained when encoding the video.

5. The method of claim 1, wherein the estimated channel capacity value, $\tilde{C}_n^{CLDS}$ is expressed by the following equation:

$$\tilde{C}_n^{CLDS} = 1 - \frac{1}{m}\sum_{i=1}^{m} H_b(\tilde{\varepsilon}_i),\quad \text{[Equation 1]}$$

wherein
$\tilde{\varepsilon}_i$ denotes an estimated bit error rate with respect to a packet i,
$H_b(\tilde{\varepsilon}_i)$ denotes an instantaneous perpacket entropy, and
m denotes a number of packets included in the single video adaptive period.

6. The method of claim 1, wherein the applying comprises applying the unequal error protection so that the video packet including an intra-coded frame (I-frame) is relatively robust against an error compared to a video packet not including the I-frame, when the I-frame is included in the video packet.

7. A method of receiving an adaptive video having a tuned coding rate and where an unequal error protection is applied, the method comprising:
receiving an unequal error protected video stream;
estimating a bit error rate using side information associated with a channel status of the unequal error protected video stream;
estimating a channel capacity value using the estimated bit error rate in accordance to the following equation:

$$\tilde{C}_n^{CLDS} = 1 - \frac{1}{m}\sum_{i=1}^{m} H_b(\tilde{\varepsilon}_i),\quad \text{[Equation 1]}$$

wherein
$\tilde{\varepsilon}_i$ denotes the estimated bit error rate with respect to a packet i,
$H_b(\tilde{\varepsilon}_i)$ denotes an instantaneous perpacket entropy, and
m denotes a number of packets included in a single video adaptive period; and
feeding back the estimated channel capacity value $\tilde{C}_n^{CLDS}$, to a video transmission apparatus.

8. The method of claim 7, further comprising: performing channel decoding of the video stream based on the unequal error protection.

9. The method of claim 7, wherein the unequal error protection is applied so that a video packet including an I-frame is relatively robust against an error compared to a video packet not including the I-frame when the I-frame is included in the video packet.

10. A video transmission apparatus of tuning a coding rate and applying an unequal error protection for an adaptive video transmission, the video transmission apparatus comprising:
a coding rate tuner to predict, as a channel capacity of a subsequent channel interval, an estimated channel capacity value that is fed back from a video reception apparatus, and to tune a video coding rate and a channel coding rate within the predicted channel capacity,
wherein the coding rate tuner calculates the video coding rate using a rate distortion function and a screen quality distortion function of a video within the predicted channel capacity, and calculates the channel coding rate using the video coding rate,
wherein the screen quality distortion function Q'(x) of the video indicates a distortion of a screen quality of the video over a surplus of the channel capacity, and is expressed by the following equation:
Q'(x)=ax$^b$+c , 0≤x≤0.12, wherein x denotes an element of the screen quality distortion function of the video, and a, b, and c denote values determined based on an experiment;
a video encoder to perform video encoding of video frames at the tuned video coding rate, and to generate the video frames as a video packet; and
a forward error correction (FEC) encoder to apply the unequal error protection based on a length of the video packet and a type of the video frames included in the video packet, and to perform channel encoding of the unequal error protected video packet at the tuned channel coding rate to generate the video packet as a bitstream.

11. The video transmission apparatus of claim 10, wherein the tuned video coding rate indicates a value at which a PSNR value of a video being transmitted is optimal during a corresponding channel interval.

12. The video transmission apparatus of claim 10, wherein x of the screen quality distortion function Q'(x) of the video denotes a difference between a coding rate to be predicted and a channel capacity expressed by the following equation:

$$x = \frac{R_n^{op} - C_n^{op}}{R_n^{op}},$$

wherein $R_n^{op}$ denotes the video/channel coding rate with the deteriorated performance in operation, and $C_n^{op}$ denotes a channel capacity value of a current channel interval.

13. The video transmission apparatus of claim 10, wherein the rate distortion function of the video indicates a function that is obtained when encoding the video.

14. The video transmission apparatus of claim 10, wherein the estimated channel capacity value is in accordance to the following equation:

$$\tilde{C}_n^{CLDS} = 1 - \frac{1}{m}\sum_{i=1}^{m} H_b(\tilde{\varepsilon}_i), \quad \text{[Equation 1]}$$

wherein $\tilde{\epsilon}_i$ denotes the value of the estimated bit error rate with respect to a packet i, $H_b(\tilde{\epsilon}_i)$ denotes an instantaneous perpacket entropy, and m denotes a number of packets included in a single video adaptive period.

15. The video transmission apparatus of claim 10, wherein, when an I-frame is included in the video packet, the FEC encoder applies the unequal error protection so that the video packet including the I-frame is relatively robust against an error compared to a video packet not including the I-frame.

16. A video reception apparatus of receiving an adaptive video having a tuned coding rate and where an unequal error protection is applied, the video reception apparatus comprising:

a channel capacity estimator to estimate a bit error rate using side information associated with a channel status of an unequal error protected video stream when the unequal error protected video stream is received, to estimate a channel capacity value using the estimated bit error rate, and to feed back the estimated channel capacity value to a video transmission apparatus, wherein the estimated channel capacity value is in accordance to the following equation:

$$\tilde{C}_n^{CLDS} = 1 - \frac{1}{m}\sum_{i=1}^{m} H_b(\tilde{\varepsilon}_i), \quad \text{[Equation 1]}$$

wherein $\tilde{\epsilon}_i$ denotes the value of the estimated bit error rate with respect to a packet i, $H_b(\tilde{\epsilon}_i)$ denotes an instantaneous perpacket entropy, and m denotes a number of packets included in a single video adaptive period.

17. The video reception apparatus of claim 16, further comprising:

a FEC decoder to perform channel decoding of the video stream based on the unequal error protection.

18. The video reception apparatus of claim 16, wherein the unequal error protection is applied so that a video packet including an I-frame is relatively robust against an error compared to a video packet not including the I-frame when the I-frame is included in the video packet.

19. The video reception apparatus of claim 16, wherein the side information comprises a checksum.

20. The video reception apparatus of claim 16, wherein the side information comprises a signal to silence ratio (SSR).

* * * * *